(12) United States Patent
Ueki

(10) Patent No.: US 6,891,572 B2
(45) Date of Patent: May 10, 2005

(54) VIDEO SIGNAL CONVERSION PROCESSING APPARATUS AND METHOD

(75) Inventor: Nobuo Ueki, Chiba (JP)

(73) Assignee: Sony Corporation (JP)

(*) Notice: Subject to any disclaimer, the term of this patent is extended or adjusted under 35 U.S.C. 154(b) by 424 days.

(21) Appl. No.: 09/850,832

(22) Filed: May 8, 2001

(65) Prior Publication Data

US 2002/0018144 A1 Feb. 14, 2002

(30) Foreign Application Priority Data

May 9, 2000 (JP) ..................................... P2000-135617

(51) Int. Cl.[7] .......................... H04N 7/01; H04N 11/20
(52) U.S. Cl. ....................... 348/458; 348/441; 348/443; 348/445; 348/446; 348/459; 348/524; 348/536; 348/537; 348/544
(58) Field of Search .............................. 348/441, 443, 348/445–446, 458–459, 497, 524, 529, 536–537, 540, 544, 547; H04N 7/01, 11/20

(56) References Cited

U.S. PATENT DOCUMENTS

| | | | | |
|---|---|---|---|---|
| 4,065,787 A | * | 12/1977 | Owen et al. ................. | 348/497 |
| 4,109,276 A | * | 8/1978 | Hopkins et al. ............. | 348/498 |
| 4,605,962 A | * | 8/1986 | Christopher et al. ........ | 348/448 |
| 4,611,225 A | * | 9/1986 | Powers ....................... | 348/443 |
| 4,673,980 A | * | 6/1987 | Murakami et al. .......... | 348/497 |
| 4,688,081 A | * | 8/1987 | Furuhata et al. ............ | 348/498 |
| 5,223,931 A | * | 6/1993 | Fernsler et al. ............. | 348/540 |
| 5,329,367 A | * | 7/1994 | Fernsler et al. ............. | 348/540 |
| 5,790,096 A | * | 8/1998 | Hill, Jr. ....................... | 345/600 |
| 5,805,233 A | * | 9/1998 | West ........................... | 348/537 |
| 5,812,210 A | * | 9/1998 | Arai et al. ................... | 348/555 |
| 5,887,114 A | * | 3/1999 | Nakatani et al. ............ | 386/90 |
| 5,929,924 A | * | 7/1999 | Chen .......................... | 348/552 |
| 5,933,196 A | * | 8/1999 | Hatano et al. .............. | 348/441 |
| 5,978,041 A | * | 11/1999 | Masuda et al. ............. | 348/563 |
| 5,999,570 A | * | 12/1999 | Chaki ......................... | 375/281 |
| 6,020,927 A | * | 2/2000 | Tanaka et al. .............. | 348/458 |
| 6,097,437 A | * | 8/2000 | Hwang ........................ | 348/441 |
| 6,229,571 B1 | * | 5/2001 | Sato ........................... | 348/446 |
| 6,311,328 B1 | * | 10/2001 | Miyazaki et al. ............ | 725/37 |
| 6,313,813 B1 | * | 11/2001 | Narui et al. ................. | 345/3.2 |
| 6,380,979 B1 | * | 4/2002 | Tokoi et al. ................. | 348/458 |
| 6,392,711 B1 | * | 5/2002 | Kesatoshi ................... | 348/581 |
| 6,441,858 B1 | * | 8/2002 | Nakamoto et al. .......... | 348/446 |
| 6,549,198 B1 | * | 4/2003 | Uto et al. .................... | 345/213 |
| 6,633,288 B2 | * | 10/2003 | Agarwal et al. ............. | 345/213 |
| 6,674,478 B2 | * | 1/2004 | Miyazaki et al. ........... | 348/441 |
| 2002/0054238 A1 | * | 5/2002 | Kunio ......................... | 348/537 |

* cited by examiner

*Primary Examiner*—Brian P. Yenke
(74) *Attorney, Agent, or Firm*—Lerner, David, Littenberg, Krumholz & Mentlik, LLP

(57) ABSTRACT

A signal processing apparatus and method for up or down conversion of an interlace signal with a high degree of accuracy. The frequency of a write system clock supplied from a PLL circuit is divided by N by a dividing circuit and then multiplied by M by a multiplying circuit to produce a readout system clock. An interpolation circuit writes a video signal into a frame memory in synchronism with the write system clock from the PLL circuit, and reads out the video signal in synchronism with the readout system clock from the multiplying circuit.

14 Claims, 14 Drawing Sheets

F I G. 1 "PRIOR ART"

"PRIOR ART"
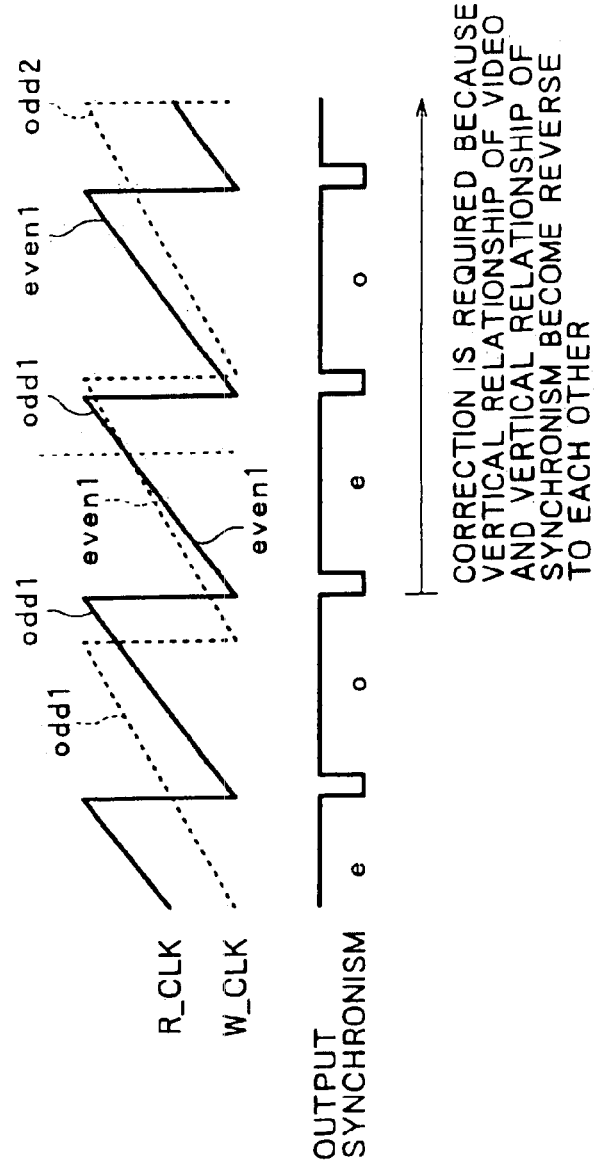
F I G. 4

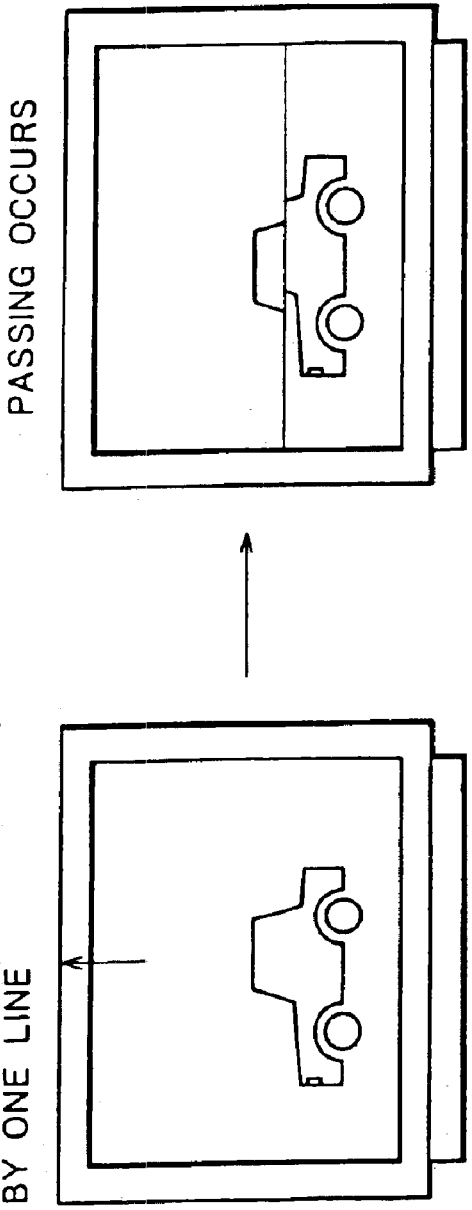

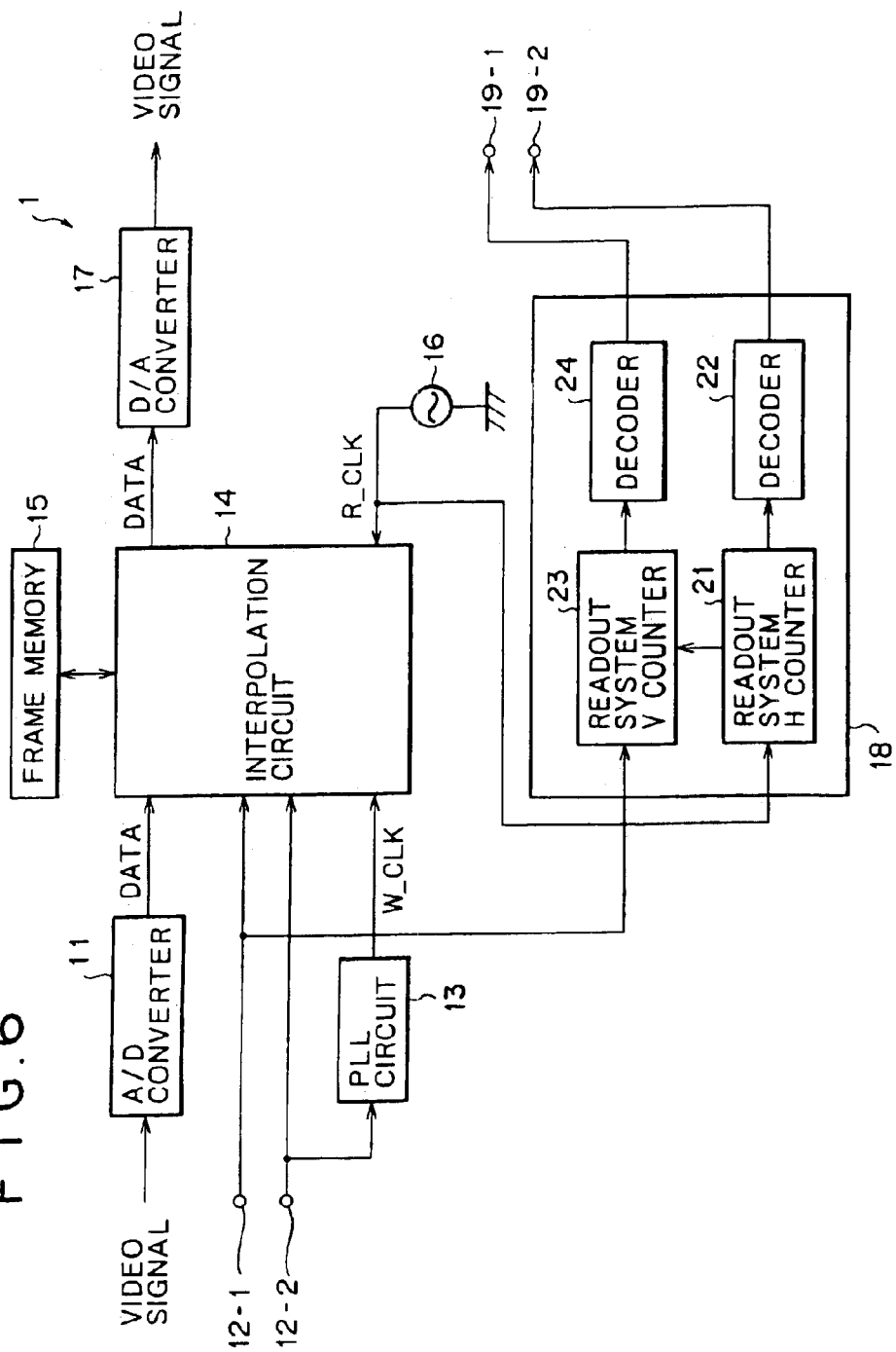
FIG.6 "PRIOR ART"

"PRIOR ART"
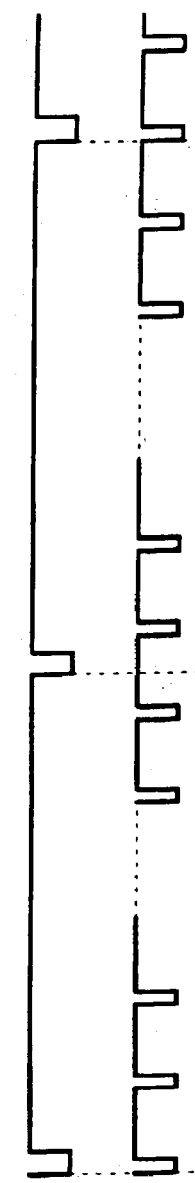
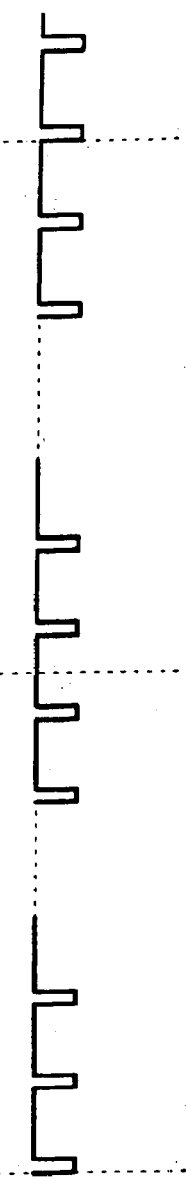
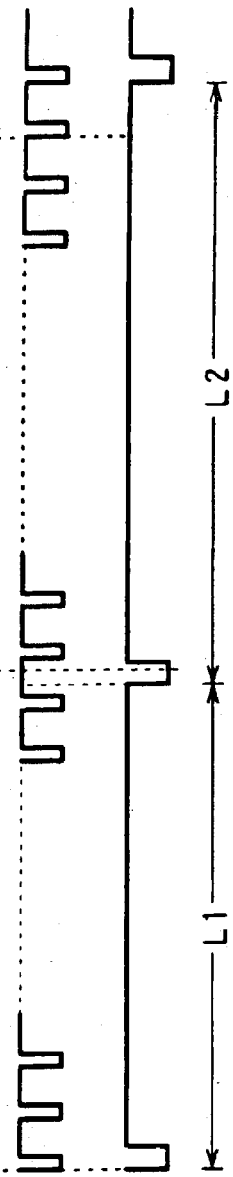
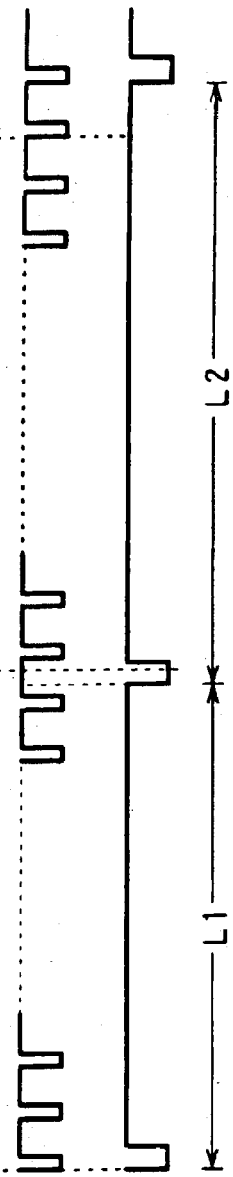
F I G. 7A in_VD
F I G. 7B in_HD
F I G. 7C out_HD
F I G. 7D out_VD

FIG. 11

| DOWN CONVERT INTO VIDEO SIGNAL OF NTSC SYSTEM | | | | | | |
|---|---|---|---|---|---|---|
| IN | OUT | W_CLK [MHz] | N | FA [kHz] | M | R_CLK [MHz] |
| 1080p@24 | 480i | 74.176 | 500 | 148.352 | 91 | 13.500 |
| 1080p@30 | 480i | 74.176 | 500 | 148.352 | 91 | 13.500 |
| 1080i@60 | 480i | 74.176 | 500 | 148.352 | 91 | 13.500 |
| 720p@60 | 480i | 74.176 | 4 | 13500.000 | 1 | 13.500 |
| DRC(NT) | 480i | 54.000 | 300 | 148.500 | 91 | 13.514 |
| MUSE | 480i | 44.550 | 2 | 13500.000 | 1 | 13.500 |
| 480p@60 | 480i | 27.000 | 1 | 13500.000 | 1 | 13.500 |
| 480i@60 | 480i | 13.500 | | | | |

| DOWN CONVERT INTO VIDEO SIGNAL OF NTSC SYSTEM FOR NTSC ENCODER | | | | | | |
|---|---|---|---|---|---|---|
| IN | OUT | W_CLK [MHz] | N | FA [kHz] | M | R_CLK [MHz] |
| 1080p@24 | 480i | 74.176 | 250 | 296.703 | 91 | 27.000 |
| 1080p@30 | 480i | 74.176 | 250 | 296.703 | 91 | 27.000 |
| 1080i@60 | 480i | 74.176 | 250 | 296.703 | 91 | 27.000 |
| 720p@60 | 480i | 74.176 | 250 | 296.703 | 91 | 27.000 |
| DRC(NT) | 480i | 54.000 | 2 | 27000.000 | 1 | 27.000 |
| MUSE | 480i | 44.550 | 150 | 297.000 | 91 | 27.027 |
| 480p@60 | 480i | 27.000 | 1 | 27000.000 | 1 | 27.000 |
| 480i@60 | 480i | 13.500 | 1 | 13500.000 | 2 | 27.000 |

F I G. 12

| DOWN CONVERT INTO VIDEO SIGNAL OF PAL SYSTEM | | | | | | | |
|---|---|---|---|---|---|---|---|
| IN | OUT | W_CLK [MHz] | N | FA [kHz] | M | R_CLK [MHz] |
| 1080i@50 | 576i | 74.250 | 22 | 3375.000 | 4 | 13.500 |
| DRC(PAL) | 576i | 54.000 | 4 | 13500.000 | 1 | 13.500 |
| 576p@50 | 576i | 27.000 | 2 | 13500.000 | 1 | 13.500 |
| 576i@50 | 576i | 13.500 | 1 | 13500.000 | 1 | 13.500 |

| DOWN CONVERT INTO VIDEO SIGNAL OF PAL SYSTEM FOR PAL ENCODER | | | | | | | |
|---|---|---|---|---|---|---|---|
| IN | OUT | W_CLK [MHz] | N | FA [kHz] | M | R_CLK [MHz] |
| 1080i@50 | 576i | 74.250 | 11 | 6750.000 | 4 | 27.000 |
| DRC(PAL) | 576i | 54.000 | 2 | 27000.000 | 1 | 27.000 |
| 576p@50 | 576i | 27.000 | 1 | 27000.000 | 1 | 27.000 |
| 576i@50 | 576i | 13.500 | 1 | 13500.000 | 2 | 27.000 |

F I G. 13

DOWN CONVERT INTO SIGNAL OF 1080i@60 SIGNAL STANDARDS

| IN | OUT | W_CLK [MHz] | N | FA [KHz] | M | R_CLK [MHz] |
|---|---|---|---|---|---|---|
| 1080p@24 | 1080i | 74.176 | 1 | 74175.824 | 1 | 74.176 |
| 1080p@30 | 1080i | 74.176 | 1 | 74175.824 | 1 | 74.176 |
| 1080i@60 | 1080i | 74.176 | 1 | 74175.824 | 1 | 74.176 |
| 720p@60 | 1080i | 74.176 | 1 | 74175.824 | 1 | 74.176 |
| DRC(NT) | 1080i | 54.000 | 91 | 593.407 | 125 | 74.176 |
| MUSE | 1080i | 44.550 | 3 | 14850.000 | 5 | 74.250 |
| 480p@60 | 1080i | 27.000 | 91 | 296.703 | 250 | 74.176 |
| 480i@60 | 1080i | 13.500 | 91 | 148.352 | 500 | 74.176 |

DOWN CONVERT INTO SIGNAL OF 1080i@50 SIGNAL STANDARDS

| IN | OUT | W_CLK [MHz] | N | FA [KHz] | M | R_CLK [MHz] |
|---|---|---|---|---|---|---|
| 1080i@50 | 1080i | 74.250 | 1 | 74250.000 | 1 | 74.250 |
| DRC(PAL) | 1080i | 54.000 | 8 | 6750.000 | 11 | 74.250 |
| 576p@60 | 1080i | 27.000 | 4 | 6750.000 | 11 | 74.250 |
| 576i@60 | 1080i | 13.500 | 2 | 6750.000 | 11 | 74.250 |

VIDEO SIGNAL CONVERSION PROCESSING APPARATUS AND METHOD

CROSS-REFERENCE TO RELATED APPLICATIONS

The present application claims the benefit of Japanese Application No. P2000-135617 filed May 9, 2000, the disclosure of which is hereby incorporated by reference herein.

BACKGROUND OF THE INVENTION

The present invention relates to a signal processing apparatus and method, and more particularly to a signal processing apparatus and method wherein a video signal of the HDTV (High Definition Television) system is down converted into another video signal of the NTSC system.

A conventionally known up-down converter typically has such a configuration as shown in FIG. 1. Referring to FIG. 1, the up-down converter generally denoted at 1 includes an A/D (Analog to Digital) converter 11 which A/D converts a video signal input thereto from an external apparatus not shown and supplies a resulting digital video signal to an interpolation circuit 14. The external apparatus further inputs a vertical synchronizing signal (in_VD) (hereinafter referred to as input vertical synchronizing signal) included in the video signal to the interpolation circuit 14 through an input terminal 12-1 and further inputs a horizontal synchronizing signal (in_HD) (hereinafter referred to as input horizontal synchronizing signal) included in the video signal to the interpolation circuit 14 and a PLL circuit 13 (Phase-Locked Loop) through another input terminal 12-2. The PLL circuit 13 produces a write system clock W_CLK synchronized with the input horizontal synchronizing signal (in_HD) input thereto through the input terminal 12-2 and outputs the write system clock W_CLK to the interpolation circuit 14.

The interpolation circuit 14 writes video data of scanning lines supplied from the A/D converter 11 into a frame memory 15 in synchronism with the write system clock W_CLK from the PLL circuit 13. Further, the interpolation circuit 14 reads out the video data written in the frame memory 15 in synchronism with a readout system clock R_CLK from an oscillator 16. Furthermore, the interpolation circuit 14 performs conversion processing of the pixel number or line number (scanning line number) for the video data read out from the frame memory 15 to perform enlargement or reduction (up or down conversion) of the video signal. A D/A (Digital to Analog) converter 17 D/A converts the video data obtained by the up or down conversion of the interpolation circuit 14 and outputs a resulting analog video signal to an external apparatus not shown.

A readout system H counter 21 of an output synchronizing signal generation circuit 18 counts the number of readout system clock signals R_CLK from the oscillator 16 and supplies the count value to a decoder 22 and a readout system V counter 23. The decoder 22 produces an output horizontal synchronizing signal (out_HD) based on the count value supplied thereto from the readout system H counter 21 and outputs the output horizontal synchronizing signal (out_HD) to the external apparatus not shown through an output terminal 19-2.

The readout system V counter 23 counts the number of H signals from the count value supplied thereto from the readout system H counter 21 and supplies the resulting count value to another decoder 24. The decoder 24 produces an output vertical synchronizing signal (out_VD) based on the count value of the H signals supplied thereto from the readout system V counter 23 and outputs the output vertical synchronizing signal (out_VD) to the external apparatus through another output terminal 19-1.

In order for the up-down converter 1 shown in FIG. 1 to output a video signal in synchronism with an output synchronizing signal of a frequency different from that of an input synchronizing signal included in the video signal, normally a method is used wherein the video signal is written into the frame memory 15 in synchronism with a write system clock W_CLK synchronized with the input horizontal synchronizing signal (in_HD) and then is read out in synchronism with a readout system clock R_CLK received from the oscillator 16.

However, the difference in period (cycle length) between the input synchronizing signal and the output synchronizing signal sometimes causes a write system line address W_ADRS into the frame memory 15 pass a readout system line address R_ADRS or causes the readout system line address R_ADRS to pass the write system line address W_ADRS conversely. Further, since the readout system H counter 21 and the readout system V counter 23 are reset each time the power supply is turned on, the phase of the output vertical synchronizing signal (out_VD) with respect to the input vertical synchronizing signal (in_VD) (FIG. 2A) varies each time the power supply is turned on as seen in FIGS. 2B to 2F.

In particular, in a field at a timing at which the power supply is turned on, even if passing does not occur by chance, since the period of the output vertical synchronizing signal (out_VD) with respect to that of the input vertical synchronizing signal (in_VD) is in a free running state, the phase of the output vertical synchronizing signal (out_VD) with respect to the input vertical synchronizing signal (in_VD) is not fixed but flows as seen in FIGS. 3A and 3B. Accordingly, the displacement in phase between the input and output vertical synchronizing signals gradually increases until passing occurs finally between the input vertical synchronizing signal (in_VD) and the output vertical synchronizing signal (out_VD) as seen in FIG. 4.

In the example of FIG. 4, reading out of an even-numbered field even1 is started at a timing at which writing of the even-numbered field even1 is not completed, and consequently, data of an odd-numbered field odd1 which have been read already are read out again from the middle.

In this manner, the interpolation circuit 14 repetitively reads out the odd-numbered field odd1 successively twice and can thereby prevent otherwise possible passing. When writing is likely to pass reading out conversely, a predetermined field is skipped without being read out.

However, when such repetitive reading out or readout skipping is performed, then the vertical relationship in interlace of input video data and the vertical relationship in interlace of output video data are reversed (video data of each line is displayed upwardly or downwardly by one line distance from the position at which the video data should originally be displayed). Thus, in order to correct the vertical relationships, a process of shifting pixels downwardly or upwardly by one line distance is performed. As a result, in the field, the image is momentarily displaced downwardly or upwardly as seen in FIG. 5.

Therefore, the input vertical synchronizing signal (in_VD) is input to the readout system V counter 23 of the output synchronizing signal generation circuit 18 as seen in FIG. 6 to reset the count value of the readout system V counter 23 for each one frame (once for each two fields) so that passing may not occur.

However, even where such a countermeasure as just described is taken, although the displacement or offset between a generation timing of the output vertical synchronizing signal (out_VD) and a generation timing of the input vertical synchronizing signal (in_VD) becomes smaller than ±1 line (1 H), since just an integral number of output horizontal synchronizing signals (out_VD) are not included within one frame of the input vertical synchronizing signal (in_VD), the line number (horizontal scanning line number) L1 of an odd-numbered field and the line number (horizontal scanning line number) L2 of an even-numbered field have different values from each other (L1≠L2). Consequently, there is a problem that a standard interlace signal cannot be output.

SUMMARY OF THE INVENTION

It is an object of the present invention to provide a signal processing apparatus and method by which an interlace signal can be up or down converted with a high degree of accuracy.

In order to attain the object described above, according to an aspect of the present invention, there is provided a signal processing apparatus for converting the pixel number or the scanning line number of a video signal input thereto, comprising a first production unit operable to produce a first signal based on a horizontal synchronizing signal included in the input video signal, a storage unit operable to store the input video signal in synchronism with the first signal as a stored video signal, a second production unit operable to divide a frequency of the first signal by a first value to produce an intermediate signal and to multiply the intermediate signal by a second value to produce a second signal, a readout device operable to read out the stored video signal in synchronism with the second signal as a read out video signal, and a conversion unit operable to convert the pixel number or the scanning line number of the read out video signal.

The signal processing apparatus may further comprise a setting unit operable to set the first value and the second value.

The setting unit may set the first value and the second value so that an integral number of horizontal scanning lines of the read out video signal are included in one frame of the input video signal.

According to another aspect of the present invention, there is provided a signal processing method for converting the pixel number or the scanning line number of an input video signal, comprising producing a first signal based on a horizontal synchronizing signal included in the input video signal, storing the input video signal in synchronism with the first signal as a stored video signal, dividing the frequency of the first signal by a first value to produce an intermediate signal, multiplying the intermediate signal by a second value to produce a second signal, reading out the stored video signal in synchronism with the second signal as a read out video signal, and converting the pixel number or the scanning line number of the read out video.

In the signal processing apparatus and the signal processing method, a first signal is produced based on a horizontal synchronizing signal included in an input video signal, and the input video signal is stored in synchronism with the thus produced first signal. Further, the frequency of the first signal is first divided by a first value and then multiplied by a second value to produce a second signal. Then, the stored video signal is read out in synchronism with the thus produced second signal, and the pixel number or the scanning line number of the thus read out video signal is converted. Therefore, an interlace signal can be up or down converted with a high degree of accuracy.

According to a further aspect of the present invention, there is provided a signal processing apparatus for converting the pixel number or the scanning line number of a video signal input thereto, comprising a generating unit operable to generate a reference signal, a production unit operable to divide the frequency of the reference signal by a first value to produce an intermediate signal and to multiply the intermediate signal by a second value to produce a predetermined signal, a storage unit operable to store the input video signal in synchronism with the predetermined signal as a stored video signal, a readout device operable to read out the stored video signal in synchronism with the reference signal as a read out video signal, and a conversion unit operable to convert the pixel number or the scanning line number of the read out video signal.

The signal processing apparatus may further comprise a setting unit operable to set the first value and the second value.

The setting unit may set the first value and the second value so that an integral number of horizontal scanning lines of the read out video signal are included in one frame of the input video signal.

According to a still further aspect of the present invention, there is provided a signal processing method for converting the pixel number or the scanning line number of an input video signal, comprising generating a reference signal, dividing the frequency of the reference signal by a first value to produce an intermediate signal, multiplying the intermediate signal by a second value to produce a predetermined signal, storing the input video signal in synchronism with the predetermined signal as a stored video signal, reading out the stored video signal in synchronism with the reference signal as a read out video signal, and converting the pixel number or the scanning line number of the read out video signal.

In the signal processing apparatus and the signal processing method, a reference signal is generated, and the frequency of the generated reference signal is first divided by a first value and then multiplied by a second value to produce a predetermined signal. Then, an input video signal is stored in synchronism with the thus produced predetermined signal. Thereafter, the stored video data is read out in synchronism with the generated reference signal, and the pixel number or the scanning line number of the read out video data is converted. Therefore, an interlace signal can be up or down converted with a high degree of accuracy with a minimized circuit scale.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 4 is a waveform diagram illustrating a passing process;

FIG. 5 is a schematic view showing a display screen when passing occurs;

FIG. 6 is a block diagram showing a configuration of another conventional up-down converter;

FIGS. 7A to 7D are time charts illustrating timings at which a synchronizing signal is output;

FIG. 11 is a view illustrating a dividing number, a multiplying number and a frequency after division which are set when a video signal of the HDTV system is down converted into a video signal of the NTSC system;

FIG. 12 is a similar view but illustrating a dividing number, a multiplying number and a frequency after division which are set when a video signal of the HDTV system is down converted into a video signal of the PAL system;

FIG. 13 is a similar view but illustrating a dividing number, a multiplying number and a frequency after division which are set when a video signal of the HDTV system is down converted into a video signal of the HDTV system of another signal specification.

DESCRIPTION OF THE PREFERRED EMBODIMENTS

Figure 1:
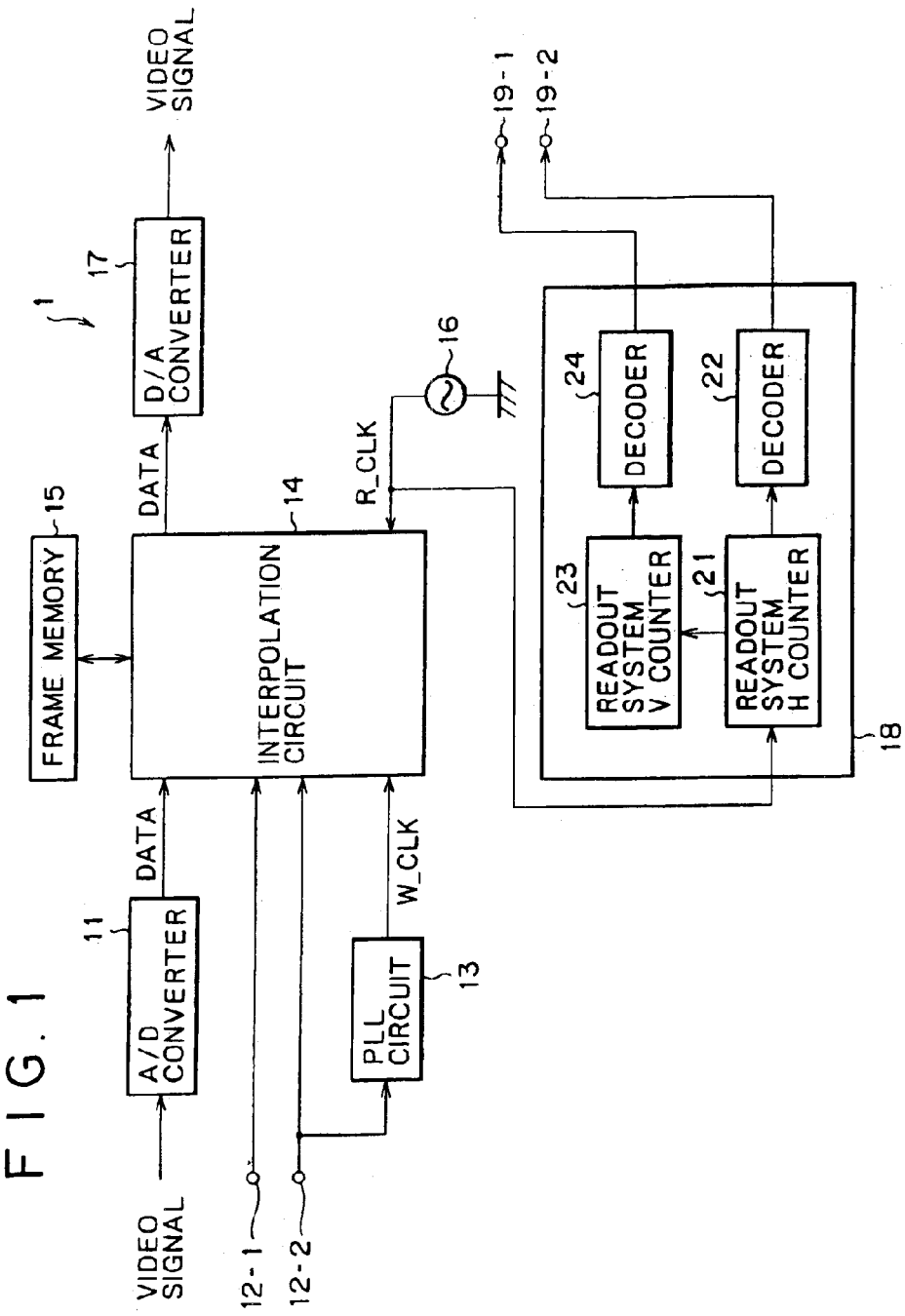
FIG. 1 is a block diagram showing an example of a configuration of a conventional up-down converter.
Figure 2:
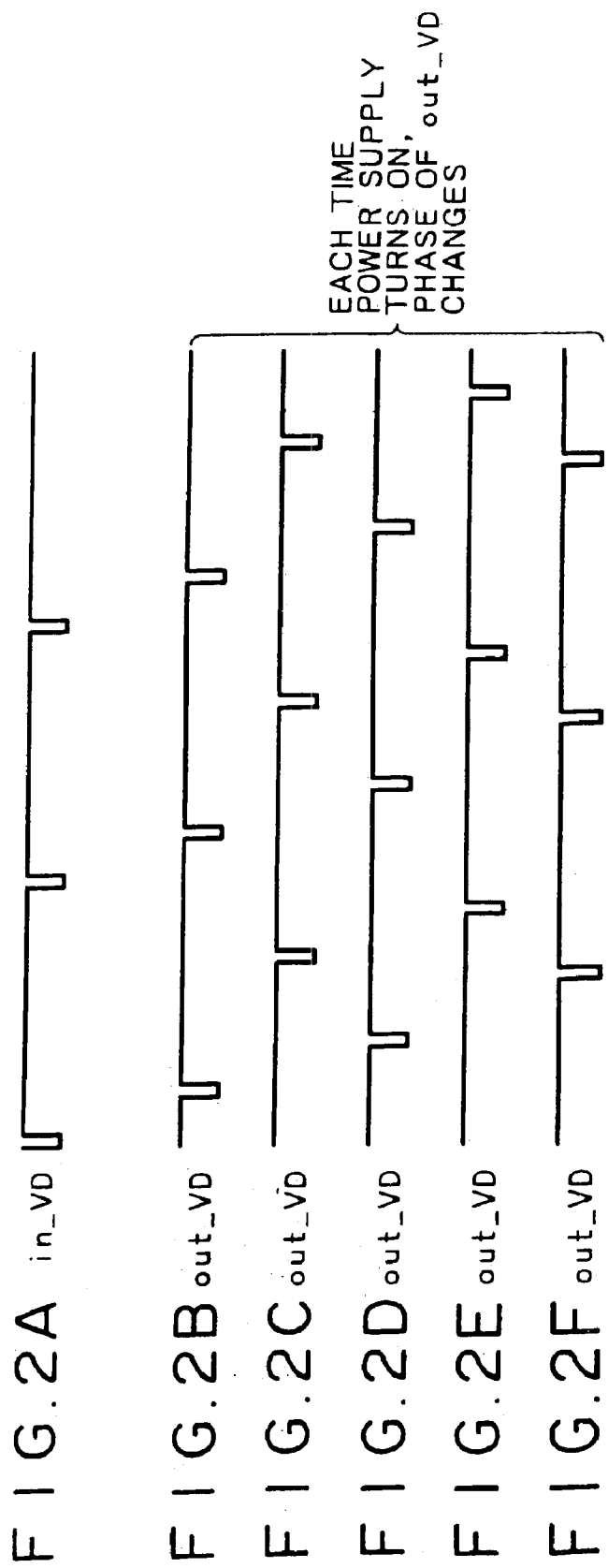
FIGS. 2A to 2F are time charts illustrating timings at which an output vertical synchronizing signal is output.
Figure 3:
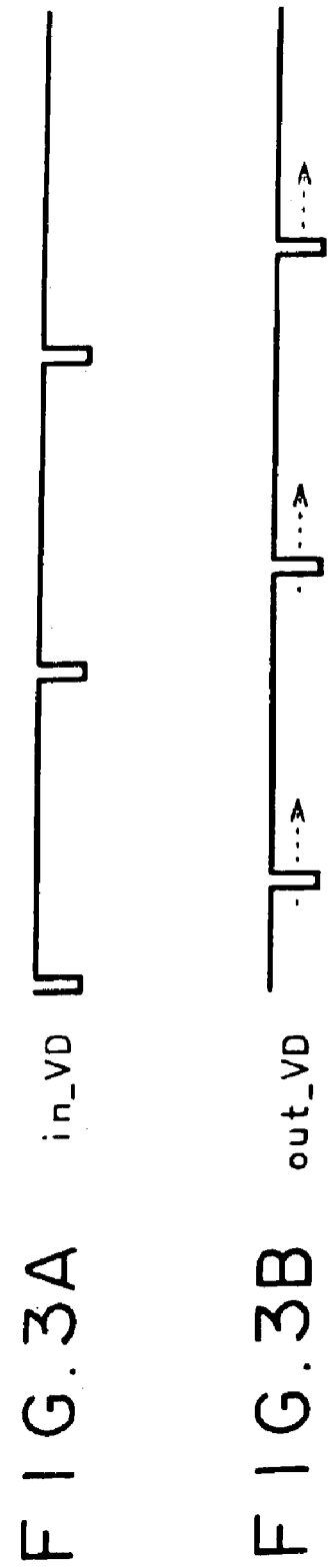
FIGS. 3A and 3B are time charts illustrating different timings at which an output vertical synchronizing signal is output.
Figure 8:
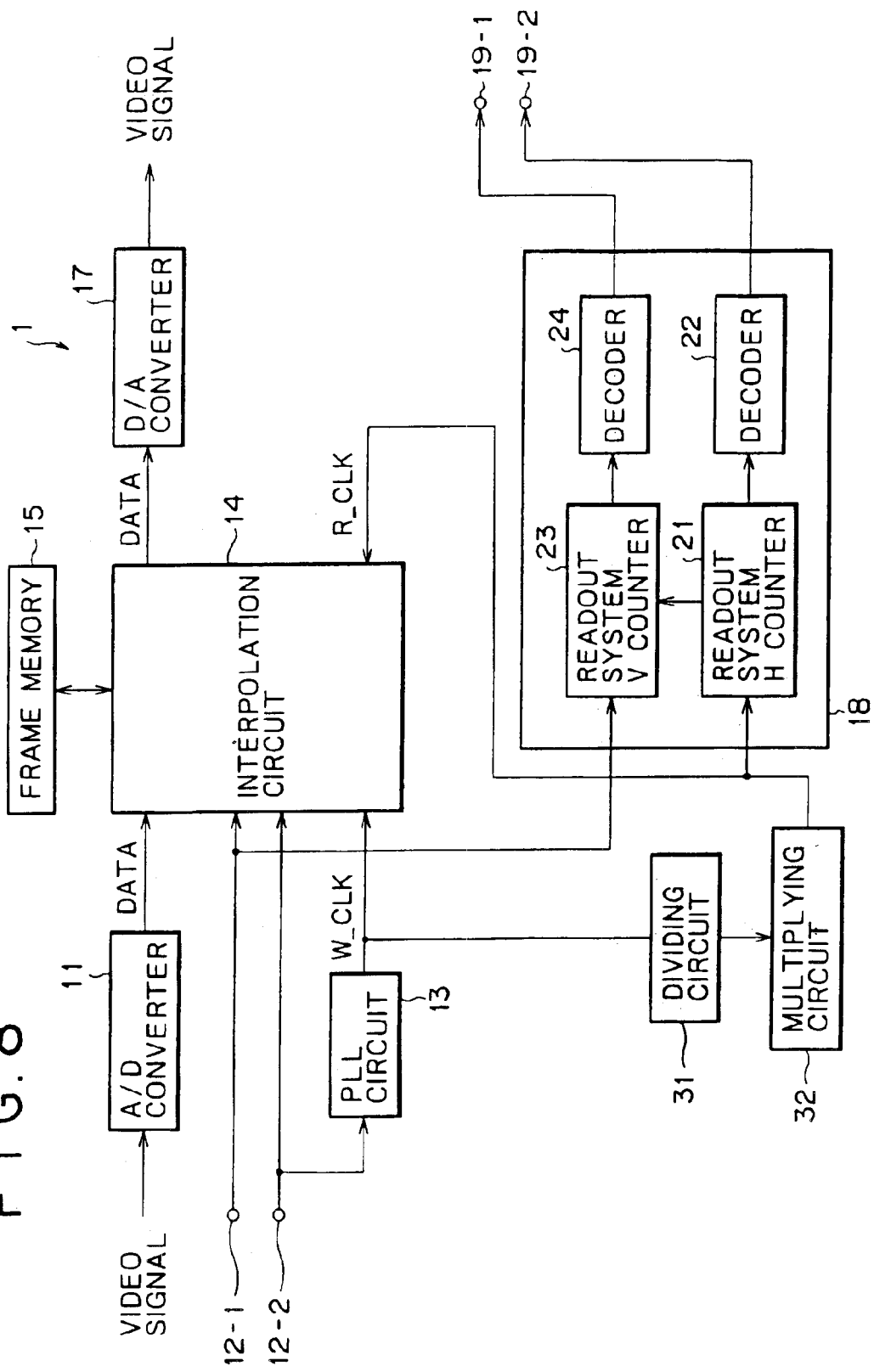
FIG. 8 is a block diagram showing an example of a configuration of an up-down converter to which the present invention is applied.

Referring to FIG. 8, there is shown an example of configuration of an up-down converter to which the present invention is applied. The up-down converter shown is generally denoted at 1 and has a pair of input terminals 12-1 and 12-2 and a pair of output terminals 19-1 and 19-2. The up-down converter 1 includes an A/D converter 11, a PLL circuit 13, an interpolation circuit 14, a frame memory 15, a D/A converter 17, and an output synchronizing signal generation circuit 18 which includes a readout system H counter 21, a decoder 22, a readout system V counter 23 and a decoder 24, all similar to those of the conventional up-down converter 1 described hereinabove with reference to FIG. 1. Therefore, like parts or elements are denoted by the same reference numerals and overlapping description is omitted herein to avoid redundancy. The up-down converter 1 according to the present configuration additionally includes a dividing circuit 31 and a multiplying circuit 32.

The dividing circuit 31 divides the frequency of a write system clock W_CLK supplied thereto from the PLL circuit 13 by N and supplies a resulting signal to the multiplying circuit 32. The multiplying circuit 32 multiplies the frequency of the write system clock W_CLK supplied thereto from the dividing circuit 31 by M to produce a readout system clock R_CLK and supplies the readout system clock R_CLK to the interpolation circuit 14 and the readout system H counter 21 of the output synchronizing signal generation circuit 18. The setting method of the dividing number N of the dividing circuit 31 and the multiplying number M of the multiplying circuit 32 are hereinafter described.

The readout system H counter 21 counts the number of readout system clock signals R_CLK from the multiplying circuit 32 and supplies the count value to the decoder 22 and the readout system V counter 23. The decoder 22 produces an output horizontal synchronizing signal (out_HD) based on the count value supplied thereto from the readout system H counter 21 and outputs the output horizontal synchronizing signal (out_HD) to an external apparatus not shown through the output terminal 19-2.

The readout system V counter 23 counts the number of H signals supplied thereto from the readout system H counter 21 and resets the count value thereof in response to the input vertical synchronizing signal (in_VD). The decoder produces an output vertical synchronizing signal (out_VD) based on the count value of the H signals supplied thereto from the readout system V counter 23 and outputs the output vertical synchronizing signal (out_VD) to the external apparatus through the output terminal 19-1.

Now, basic operation of the up-down converter 1 of FIG. 8 described above is described below.

The A/D converter 11 A/D converts a video signal input thereto from an external apparatus not shown and supplies a resulting signal to the interpolation circuit 14. Further, the external apparatus supplies the input vertical synchronizing signal (in_VD) to the interpolation circuit 14 through the input terminal 12-1 and supplies the input horizontal synchronizing signal (in_HD) to the interpolation circuit 14 and the PLL circuit 13 through the input terminal 12-2. The PLL circuit 13 produces a write system clock W_CLK synchronized with the input horizontal synchronizing signal (in_HD) supplied thereto through the input terminal 12-2 and supplies the write system clock W_CLK to the interpolation circuit 14 and the dividing circuit 31.

The dividing circuit 31 divides the frequency of the write system clock W_CLK supplied thereto from the PLL circuit 13 by N and supplies a resulting signal to the multiplying circuit 32. The multiplying circuit 32 multiplies the frequency of the write system clock W_CLK supplied thereto from the dividing circuit 31 by M to produce a readout system clock R_CLK and supplies the readout system clock R_CLK to the interpolation circuit 14 and the readout system H counter 21 of the output synchronizing signal generation circuit 18.

The readout system H counter 21 counts the number of readout system clock signals R_CLK from the multiplying circuit 32. The decoder 22 produces an output horizontal synchronizing signal (out_HD) based on the count value from the readout system H counter 21. The readout system V counter 23 counts the count value of the readout system H counter 21 to count the number of H signals. The count value of the readout system V counter 23 is reset at a rate of once per one frame (once per two fields) based on the input vertical synchronizing signal (in_VD). The decoder 24 produces an output vertical synchronizing signal (out_VD) based on the count value of the H signals counted by the readout system V counter 23.

The interpolation circuit 14 writes video data of each scanning line supplied thereto from the A/D converter 11 into the frame memory 15 in synchronism with the write system clock W_CLK from the PLL circuit 13. Further, the interpolation circuit 14 reads out the video data written in the frame memory 15 in synchronism with the readout system clock R_CLK received from the multiplying circuit 32. The interpolation circuit 14 further performs enlargement or reduction (up or down conversion) of the video data read out from the frame memory 15. The D/A converter 17 D/A converts the video data obtained by the up or down conversion of the interpolation circuit 14 and outputs a resulting analog video signal to the external apparatus.

Now, operation of down converting a video signal of the HDTV (High Definition Television) system into another video signal of the NTSC (National Television System Committee) system is described with reference to FIGS. 9A to 9D and 10A to 10D. As seen from FIGS. 9A to 9D, a video signal of the HDTV system is formed such that one frame (FIG. 9A) includes 1,125 horizontal scanning lines and each horizontal scanning line (FIG. 9B) includes 2,200 dots. A video signal of the NTSC system is formed such that one frame (FIG. 9C) includes 525 horizontal scanning lines and each horizontal scanning line (FIG. 9D) includes 858 dots.

Figure 9:
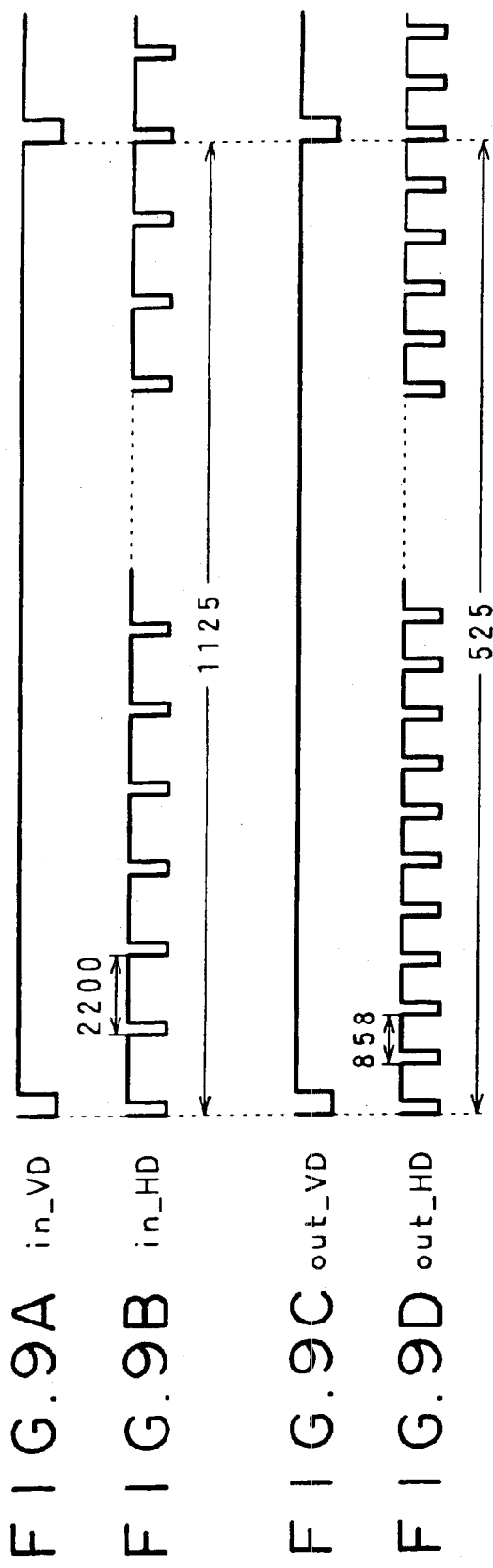
FIGS. 9A to 9D are time charts illustrating operation of down converting a video signal of the HDTV system into another video signal of the NTSC system.

According to the present invention, in order to make the numbers of horizontal scanning lines of an even-numbered field and an odd-numbered field coincide with each other, the readout system clock R_CLK is generated so that just an integral number of horizontal scanning lines defined by the output horizontal synchronizing signal (out_HD) (FIG. 9D) may be included in one frame defined by the input vertical synchronizing signal (in_VD) (FIG. 9A). To this end, the readout system clock R_CLK is determined from the horizontal scanning line number and the dot number of one horizontal scanning line both of which are known. In other words, according to the present invention, the lengths of one frame of input and output signals may be equal to each other in a unit of a clock. Therefore, for example, where the one-clock period of the HDTV system is represented by T1 (s) and the one-clock period of the NTSC system is represented by T2 (s), the clock periods T1 and T2 are set so as to satisfy the following expression (1):

$$1125 \text{ (lines)} \cdot 2200 \text{ (dots)} \cdot T1 = 525 \text{ (lines)} \cdot 858 \text{ (dots)} \cdot T2 \quad (1)$$

By expanding the expression (1) above, the following expression (2) is obtained:

$$T2 = 500/91 \cdot T1 \quad (2)$$

Further, by converting the expression (2) above into a frequency 1/T2, the following expression (3) is obtained:

$$1/T2 = (91/500) \cdot (1/T1) = (M/N) \cdot (1/T1) \quad (3)$$

Here, if the clock frequency of the video signal of the HDTV system is 1T1=74.176 MHz, then from the expression (3) given above, the clock frequency 1T2 of the video signal of the NTSC system is given by the following expression:

$$1T2 = (91/500) \cdot 74.176 = 13.5 \text{ (MHz)}$$

Figure 10:
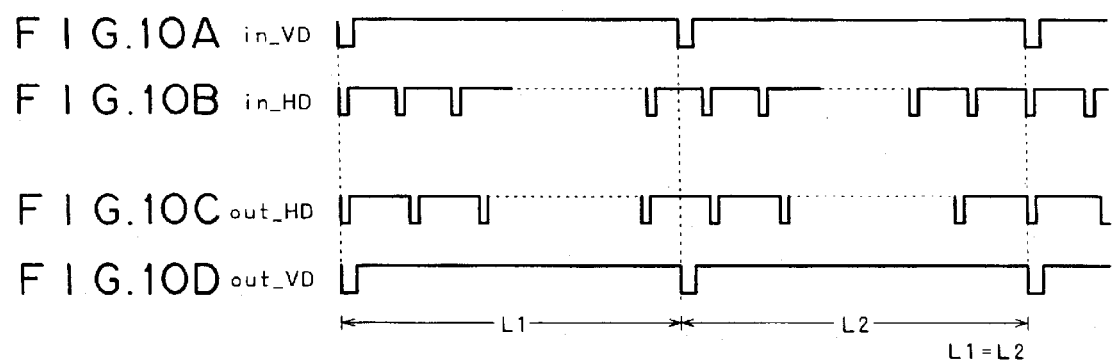
FIGS. 10A to 10D are time charts illustrating a timing at which an output vertical synchronizing signal is output.

In particular, if the value of the dividing number N of the dividing circuit 31 is set to 500 and the value of the multiplying number M of the multiplying circuit 32 is set to 91 to produce a readout system clock R_CLK (in the present case, a clock having a frequency of 13.5 MHz) from the write system clock W_CLK, then the line number L1 of an odd-numbered field and the line number L2 of an even-numbered field become equal to each other (L1=L2) as seen from FIG. 10. Consequently, a standard interlace signal can be output.

FIGS. 11 to 13 illustrate the dividing number, the multiplying number and the frequency after division which are set in order to down convert a video signal. Referring to FIGS. 11 to 13, IN represents a video signal input to the up-down converter 1, OUT an up or down converted video signal output from the up-down converter 1, W_CLK (MHz) the frequency of the write system clock output from the PLL circuit 13, N the dividing number of the dividing circuit 31, FA (KHz) the frequency after division, M the multiplying number of the multiplying circuit 32, and R_CLK the frequency of the readout system clock output from the multiplying circuit 32 to the interpolation circuit 14.

FIG. 11 illustrates the dividing number, the multiplying number and the frequency after division which are set when a video signal of the HDTV system is down converted into another video signal of the NTSC system wherein the signal specification is 480i (interlace). In the example illustrated, when a video signal of the HDTV system whose signal specification is 1080@p (progressive) 24, 1080@p30, 1080@or 720p@60 is down converted, where the frequency of the write system clock is W_CLK=74.146 MHz, from the expression (3) given hereinabove, the dividing number N is set to 500, the multiplying number M to 91, and the frequency FA after the division to 148.352 (=74.176·1000/500) KHz, and a readout system clock whose frequency is R_CLK =13.500 MHz is produced.

Meanwhile, when a video signal (NTSC double speed signal) whose signal specification is the DRC (Digital Reality Creation) is to be down converted, where the frequency of the write system is W_CLK =54.000 MHz, from the expression (3) given hereinabove, the dividing number N is set to 4, the multiplying number M to 1, and the frequency FA after the division to 13500.000 (=54.000·1000/4) KHz, and a readout system clock whose frequency is R_CLK= 13.500 MHz is produced. When a video signal of the HDTV system whose signal specification is the MUSE (Multiple Sub-nyquist Sample Encoding) is to be down converted, where the frequency of the write system is W_CLK=44.550 MHz, from the expression (3) given hereinabove, the dividing number N is set to 300, the multiplying number M to 91, and the frequency FA after the division to 148.500 (=44.550·1000/300) KHz, and a readout system clock whose frequency is R_CLK=13.514 MHz is produced.

Furthermore, when a video signal of the HDTV system whose signal specification is 480p@60 is to be down converted, where the frequency of the write system is W_CLK=27.000 MHz, from the expression (3) given hereinabove, the dividing number N is set to 2, the multiplying number M to 1, and the frequency FA after the division to 13500.000 (=27.000·1000/2) KHz, and a readout system clock whose frequency is R_CLK=13.500 MHz is produced. When a video signal of the HDTV system whose signal specification is 480i@60 is to be down converted, where the frequency of the write system is W_CLK=13.500 MHz, from the expression (3) given hereinabove, the dividing number N is set to 1, the multiplying number M to 1, and the frequency FA after the division to 13500.000 (=13.500·1000/1) KHz, and a readout system clock whose frequency is R_CLK=13.500 MHz is produced.

Further, when a video signal of the HDTV system is to be down converted into another video signal of the NTSC system whose signal specification for an NTSC encoder is 480i, the dividing number N, the multiplying number M and the frequency FA after the division are set in such a manner as described above (description of which is omitted herein), and a readout system clock whose frequency is R_CLK= 27.000 MHz is produced. However, only when a video signal (an NTSC double speed signal) whose signal specification is the DRC is to be down converted, a readout system clock whose signal frequency is R_CLK=27.027 MHz is produced.

FIG. 12 illustrates the dividing number, the multiplying number and the frequency after division which are set when a video signal of the HDTV system is down converted into another video signal of the PAL (Phase Alternation by Line) system whose signal specification is 576i. In the example illustrated, the dividing number, the multiplying number and the frequency after division are set in such a manner as described above, and a readout system clock whose frequency is R_CLK=13.500 MHz is produced. However, only when a video signal is to be down converted into another video signal of the PAL system whose signal specification for a PAL encoder is 576i, a readout system clock whose signal frequency is R_CLK=27.000 MHz is produced.

FIG. 13 illustrates the diving number, the multiplying number and the frequency after division which are set when a video signal of the HDTV system is down converted into another video signal of the HDTV system whose signal specification is 1080i@60 or when a video signal of the HDTV system is down converted into another video signal of the HDTV system whose signal specification is 1080i@50. In the example illustrated, the dividing number, the multiplying number and the frequency after division are set in such a manner as described above, and a readout system clock whose frequency is R_CLK=74.176 MHz is produced. However, only when a video signal of the HDTV system whose signal specification is the MUSE is to be down converted or only when a video signal of the HDTV system is to be down converted into another video signal of the HDTV system whose signal specification is 1080i@50, a readout system clock whose signal frequency is R_CLK= 74.250 MHz is produced.

If the dividing number N and the multiplying number M are set to produce a readout system clock R_CLK so that just an integral number of output horizontal synchronizing signals (out_HD) (output horizontal scanning line number) may be included in one frame in such a manner as described above, then an interlace signal can be up or down converted with a high degree of accuracy. This similarly applies where values of the dividing number N and the multiplying number M multiplied by an integer are used.

Figure 14:
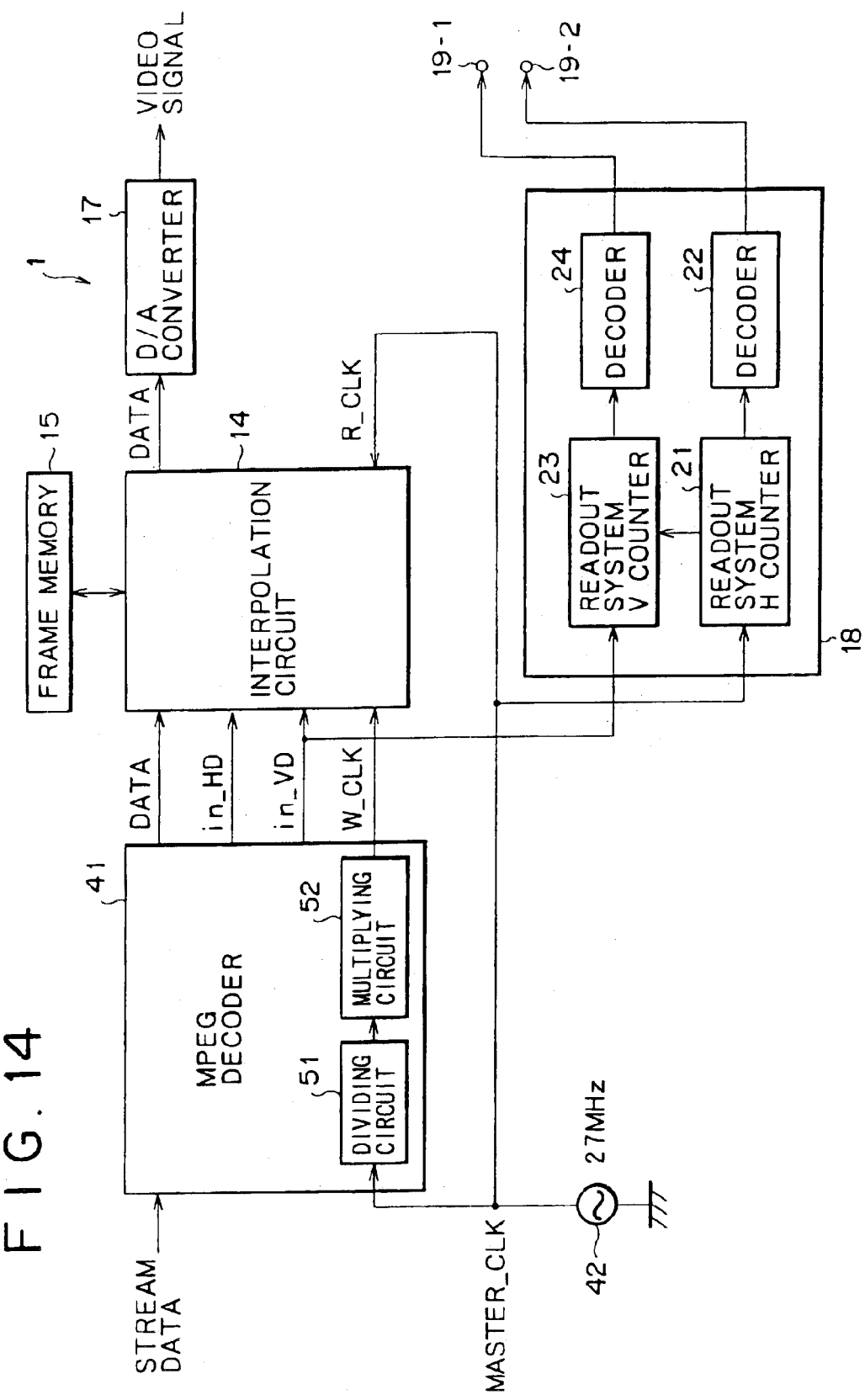
FIG. 14 is a block diagram showing an example of a configuration of another up-down converter to which the present invention is applied.

FIG. 14 shows another up-down converter to which the present invention is applied. Referring to FIG. 14, the up-down converter is generally denoted at 1 similarly and is a modification to but is different from the up-down converter 1 described hereinabove with reference to FIG. 8 in that it includes an MPEG (Moving Picture Experts Group) decoder 41 and an oscillator 42 in place of the A/D converter 11, PLL circuit 13, dividing circuit 31 and multiplying circuit 32 of the up-down converter 1 of FIG. 8. Therefore, like parts or elements are denoted by the same reference numerals and overlapping description is omitted herein to avoid redundancy.

The MPEG decoder 41 demultiplexes stream data input from an external apparatus, performs predetermined decoding processing for the stream data to obtain video data, an input vertical synchronizing signal (in_VD) and an input horizontal synchronizing signal (in_HD), which are supplied to the interpolation circuit 14. The MPEG decoder 41 has a dividing circuit 51 and a multiplying circuit 52 built therein. The dividing circuit 51 divides the frequency (in the present case, 27 MHz) of a master clock MASTER_CLK from the oscillator 42 by A and the multiplying circuit 52 multiplies a resulting signal of the dividing circuit 51 by B to produce a write system clock W_CLK. The write system clock W_CLK is supplied to the interpolation circuit 14.

The value of the dividing number A of the dividing circuit 51 and the value of the multiplying umber B of the multiplying circuit 52 are set so that just an integral number of output horizontal synchronizing signals (out_HD) (output horizontal scanning line number) may be included in one frame. Consequently, the master clock MASTER_CLK from the oscillator 42 can be used as it is as a readout system clock R_CLK. Accordingly, in the circuit shown in FIG. 14, the readout system clock R_CLK need not be produced newly, and consequently, the circuit can be reduced in size.

As described above, where the values of the dividing number (N or A) and the multiplying number (M or B) are set so that just an integral number of output horizontal synchronizing signals (out_HD) (output horizontal scanning line number) may be included in one frame of an input, an interlace signal can be up or down converted with a high degree of accuracy.

While preferred embodiments of the present invention have been described using specific terms, such description is for illustrative purposes only, and it is to be understood that changes and variations may be made without departing from the spirit or scope of the following claims.

What is claimed is:

1. A signal processing apparatus for converting the pixel number or the scanning line number of an input video signal compatible with a format of a first video system, comprising:
   a first production unit operable to produce first signal based on a horizontal synchronizing signal included in the input video signal;
   a storage unit operable to store the input video signal in synchronization with said first signal as a stored video signal;
   a second production unit operable to divide a frequency of said first signal by a first value to produce an intermediate signal and to multiply said intermediate signal by a second value to produce a second signal;
   a readout device operable to read out said stored video signal in synchronization with said second signal as a readout video signal such that during a readout operation the line number of an odd-numbered field is equal to the line number of an even numbered field; and
   a conversion unit operable to convert the pixel number or the scanning line number of said readout video signal into a format compatible with a second video system.

2. A signal processing apparatus according to claim 1, further comprising a setting unit operable to set said first value and said second value.

3. A signal processing apparatus according to claim 2, wherein said setting unit is operable to set said first value and said second value so that an integral number of horizontal scanning lines of said readout video signal are included in one frame of the input video signal.

4. A signal processing apparatus according to claim 1, wherein the first video system is an HDTV system and the second video system is an NTSC system.

5. A signal processing apparatus according to claim 1, wherein the first video system is an HDTV system and the second video system is a PAL system.

6. A method for converting the pixel number or the scanning line number of an input video signal compatible with a format of a first video system, comprising:
   producing a first signal based on a horizontal synchronizing signal included in the input video signal;
   storing the input video signal in synchronization with the first signal as a stored video signal;
   dividing the frequency of the first signal by a first value to produce an intermediate signal;
   multiplying the intermediate signal by a second value to produce a second signal;

reading out the stored video signal in synchronization with the second signal as a readout video signal such that during a readout operation the line number of an odd-numbered field is equal to the line number of an even-numbered field; and converting the pixel number or the scanning line number of the readout video signal into a format compatible with a second video system.

7. A conversion method according to claim 6, further comprising setting the first value and the second value.

8. A conversion method according to claim 7, wherein the setting step sets the first value and the second value so that an integral number of horizontal scanning lines of the readout video signal are included in one frame of the input video signal.

9. A signal processing apparatus for converting the pixel number or the scanning line number of a video signal input thereto, comprising:

a generating unit operable to generate a reference signal;

a production unit operable to divide the frequency of said reference signal by a first value to produce an intermediate signal and to multiply said intermediate signal by a second value to produce a predetermined signal;

a storage unit operable to store the input video signal in synchronization with said predetermined signal as a stored video signal;

a readout device operable to read out said stored video signal in synchronization with said reference signal as a readout video signal such that during a readout operation the line number of an odd-numbered field is equal to the line number of an even-numbered field; and a conversion unit operable to convert the pixel number or the scanning line number of said readout video signal.

10. A signal processing apparatus according to claim 9, further comprising a setting unit operable to set said first value and said second value.

11. A signal processing apparatus according to claim 10, wherein said setting unit is operable to set said first value and said second value so that an integral number of horizontal scanning lines of said readout video signal are included in one frame of the input video signal.

12. A method for converting the pixel number or the scanning line number of an input video signal, comprising:

generating a reference signal;

dividing the frequency of the reference signal by a first value to produce an intermediate signal;

multiplying the intermediate signal by a second value to produce a predetermined signal;

storing the input video signal in synchronization with the predetermined signal as a stored video signal;

reading out the stored video signal in synchronization with the reference signal as a readout video signal such that during a readout operation the line number of an odd-numbered field is equal to the line number of an even-numbered field; and converting the pixel number or the scanning line number of the readout video signal.

13. A conversion method according to claim 12, further comprising setting the first value and the second value.

14. A conversion method according to claim 13, wherein the setting step sets the first value and the second value so that an integral number of horizontal scanning lines of the readout video signal are included in one frame of the input video signal.

* * * * *

UNITED STATES PATENT AND TRADEMARK OFFICE
CERTIFICATE OF CORRECTION

PATENT NO. : 6,891,572 B2
DATED : May 10, 2005
INVENTOR(S) : Nobuo Ueki

It is certified that error appears in the above-identified patent and that said Letters Patent is hereby corrected as shown below:

<u>Column 10,</u>
Line 25, after the word "produce" insert -- a --.
Line 39, insert -- - -- between the word "even" and the word "numbered.".

Signed and Sealed this

Sixth Day of September, 2005

JON W. DUDAS
*Director of the United States Patent and Trademark Office*